US011880704B2

(12) United States Patent
Tsirkin et al.

(10) Patent No.: US 11,880,704 B2
(45) Date of Patent: Jan. 23, 2024

(54) NESTED VIRTUAL MACHINE SUPPORT FOR HYPERVISORS OF ENCRYPTED STATE VIRTUAL MACHINES

(71) Applicant: RED HAT, INC., Raleigh, NC (US)

(72) Inventors: Michael Tsirkin, Westford, MA (US); Karen Lee Noel, Concord, CA (US)

(73) Assignee: Red Hat, Inc., Raleigh, NC (US)

( * ) Notice: Subject to any disclaimer, the term of this patent is extended or adjusted under 35 U.S.C. 154(b) by 428 days.

(21) Appl. No.: 16/910,565

(22) Filed: Jun. 24, 2020

(65) Prior Publication Data
US 2021/0406051 A1 Dec. 30, 2021

(51) Int. Cl.
*G06F 9/455* (2018.01)
*G06F 9/30* (2018.01)
*G06F 21/60* (2013.01)
*G06F 21/62* (2013.01)

(52) U.S. Cl.
CPC ...... *G06F 9/45558* (2013.01); *G06F 9/30123* (2013.01); *G06F 21/602* (2013.01); *G06F 21/6218* (2013.01); *G06F 2009/45562* (2013.01); *G06F 2009/45566* (2013.01)

(58) Field of Classification Search
CPC ............. G06F 9/45558; G06F 9/30123; G06F 21/602; G06F 21/6218; G06F 2009/45562; G06F 2009/45566; G06F 2009/45587
See application file for complete search history.

(56) References Cited

U.S. PATENT DOCUMENTS

| 8,458,698 | B2 | 6/2013 | Ben-Yehuda et al. | |
|---|---|---|---|---|
| 8,490,090 | B2 | 7/2013 | Ben-Yehuda et al. | |
| 10,467,033 | B2 | 11/2019 | Tian et al. | |
| 2011/0047544 | A1* | 2/2011 | Yehuda | G06F 9/4555 718/1 |
| 2011/0153909 | A1 | 6/2011 | Dong | |
| 2014/0053272 | A1 | 2/2014 | Lukacs et al. | |
| 2014/0123238 | A1* | 5/2014 | Bacher | G06F 9/468 726/4 |
| 2015/0319160 | A1* | 11/2015 | Ferguson | G06F 21/6281 726/10 |
| 2016/0147555 | A1* | 5/2016 | Hepkin | G06F 9/44 718/1 |
| 2017/0132158 | A1* | 5/2017 | Axnix | H04L 9/14 |
| 2019/0108051 | A1 | 4/2019 | Wang et al. | |
| 2019/0155630 | A1 | 5/2019 | Zhu et al. | |
| 2019/0205259 | A1* | 7/2019 | Das | G06F 12/1009 |
| 2021/0173790 | A1* | 6/2021 | Kakaiya | G06F 12/109 |

OTHER PUBLICATIONS

Lim, J.T., et al. (Oct. 28, 2017). "NEVE: Nested Virtualization Extensions for ARM", Columbia University; ARM Ltd, SOSP '17, pp. 201-2017.

* cited by examiner

*Primary Examiner* — Jorge A Chu Joy-Davila
(74) *Attorney, Agent, or Firm* — Womble Bond Dickinson (US) LLP

(57) ABSTRACT

A method includes creating, by a hypervisor executing on a processing device, a first virtual machine nested within a second virtual machine. The method further includes identifying a context of the second virtual machine and providing, to a context of the first virtual machine, a parent context pointer indicating the context of the second virtual machine.

17 Claims, 6 Drawing Sheets

NESTED VIRTUAL MACHINE SUPPORT FOR HYPERVISORS OF ENCRYPTED STATE VIRTUAL MACHINES

TECHNICAL FIELD

Aspects of the present disclosure relate to nested virtual environments, and more particularly, nested virtual machine support for hypervisors of encrypted state virtual machine.

BACKGROUND

A hypervisor abstracts the physical resources of a computing device such as physical processing devices (e.g., processors, CPUs, etc.) and physical memory (e.g., RAM) into virtual resources. The hypervisor manages and assigns the virtual resources to virtual machines (VMs) running on the computing device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
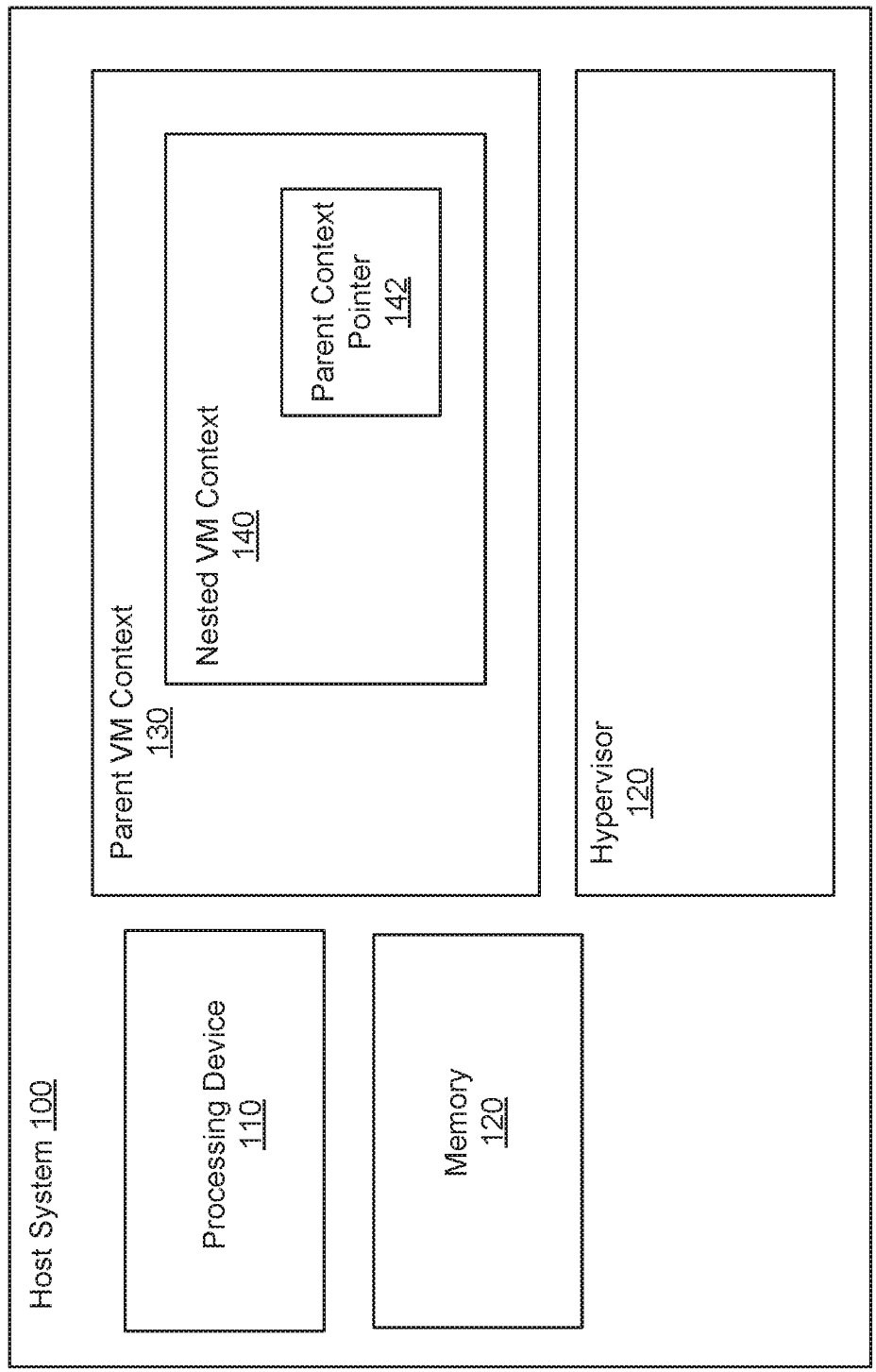
FIG. 1 is a system diagram that illustrates an example of a system for nested VM support in hypervisors of encrypted state virtual machines, in accordance with some embodiments.

Secure encrypted virtualization (SEV) is a technology that is designed to isolate VMs from the hypervisor, other VMs, and any other code that may coexist on the physical host at the hardware level. Thus, SEV may protect a virtual machine from physical security threats as well as other VMs and the hypervisor itself. SEV may prevent the hypervisor from interfering with the functioning of the virtual machine. SEV allows a VM to mark selected pages as encrypted in the guest page table entries for that VM and uses a separate encryption key for each VM to provide isolation between VMs. SEV-encrypted state (SEV-ES) may additionally provide encryption for VM data in registers of a processor. However, SEV and SEV-ES does not support encryption in nested virtualization (i.e., a virtual machine running within another virtual machine). In conventional systems, several issues arise when nesting virtual machines within an encrypted VM. For example, a nested VM that is unencrypted may bypass the encrypted parent to the root hypervisor, potentially leaking sensitive information of the parent to the hypervisor. In traditional systems when a nested virtual machine attempts to execute a privileged instruction (e.g., a hypercall to hypervisor), control may switch directly to the root hypervisor to handle the privileged instruction (i.e., a VM exit to the root hypervisor).

Aspects of the disclosure address the above-noted and other deficiencies by providing nested VM support for a hypervisor of an encrypted state VM. In particular, when creating a virtual machine context for a nested VM, the hypervisor may include in the nested VM context a parent context pointer indicating the parent VM context of the nested VM. The hypervisor may also set a flag indicating whether the VM is nested or not (e.g., a bit included in the context may be set to indicate a nested state). Therefore, each virtual machine may be identified as a nested VM or a root VM. The root hypervisor may also configure a processing device, on which the hypervisor and VMs execute, to detect a privileged instruction within the nested VM context and to switch to the parent VM context in response rather than exiting directly to the root hypervisor. For example, the processing device may receive a hypercall instruction from the nested VM and then identify the parent VM using the parent VM context pointer of the nested VM context. The processing device may then switch to the context of the parent VM rather than directly exiting to the root hypervisor.

In addition, a guest hypervisor may execute in the parent VM to create and manage the nested VMs. The guest hypervisor may receive a request to create a new virtual machine nested within the parent virtual machine. In one example, the parent VM may be encrypted. In such a case, the guest hypervisor may configure the processing device to determine whether the nested VM is encrypted. If the nested VM is a non-encrypted state VM, the processing device may refuse linking of the non-encrypted nested VM as a guest of the encrypted state parent VM. Additionally, the root hypervisor may configure the processing device to refuse the linking of the nested VM to the parent VM, after which the guest hypervisor may verify that the linking should be refused.

Accordingly, the present disclosure provides for nested VM support for a hypervisor of an encrypted state VM. The parent context pointer included in a VM context provides the ability for VM exit (VM trap) through a parent VM, such that information leaks due to nested VM exit to the parent or root hypervisor are avoided. Thus, the hypervisor cannot insert itself between the different levels of VMs, providing the ability to securely run a guest VM within an encrypted state VM. Furthermore, creation of non-encrypted VMs nested within an encrypted VM may be prevented. Thus, encrypted state support is extended to allow nested virtual machines within an encrypted state VM.

FIG. 1 is a block diagram illustrating a system for supporting nested VMs in an encrypted parent VM. A host system 100 includes a processing device 110 and a memory 120. The host system 100 may be any type of computing system, such as a server computer, desktop computer, laptop computer, tablet computer, smartphone, set-top box, etc. The processing device 110 may include one or more central processing units (CPUs), general processing unit, graphics processing unit (GPU), or any other processing device to execute a hypervisor 120 and one or more virtual machines. The hypervisor may manage creation and execution of the one or more virtual machines. The hypervisor 120 may abstract resources of the host system 100 and allocate the abstracted resources for use by the one or more virtual machines.

In one example, the hypervisor 120 may create a virtual machine and a context for the virtual machine. When creating a context of a virtual machine nested within another virtual machine, the hypervisor 120 may include within the nested VM context (e.g., nested VM context 140) a parent context pointer (e.g., parent context pointer 142) which points to the context of the parent VM context (e.g., parent VM context 130). For example, the hypervisor 120 may create and manage a first VM (parent VM context 130) and a second virtual machine nested within the first virtual machine (nested VM context 140). Upon creating the nested VM context 140, the hypervisor 120 may provide a parent context pointer 142 to the nested VM context 140 indicating the context of the parent VM (parent VM context 140). As described in further detail with respect to FIG. 2, the hypervisor 120, or a nested hypervisor in nested VM context 140, may configure the processing device 110 to detect a privileged instruction. In response to the privileged instruction, the processing device 110 may switch to a context of the parent VM context 130 and then from the parent VM context 130 to the hypervisor 120.

Figure 2:
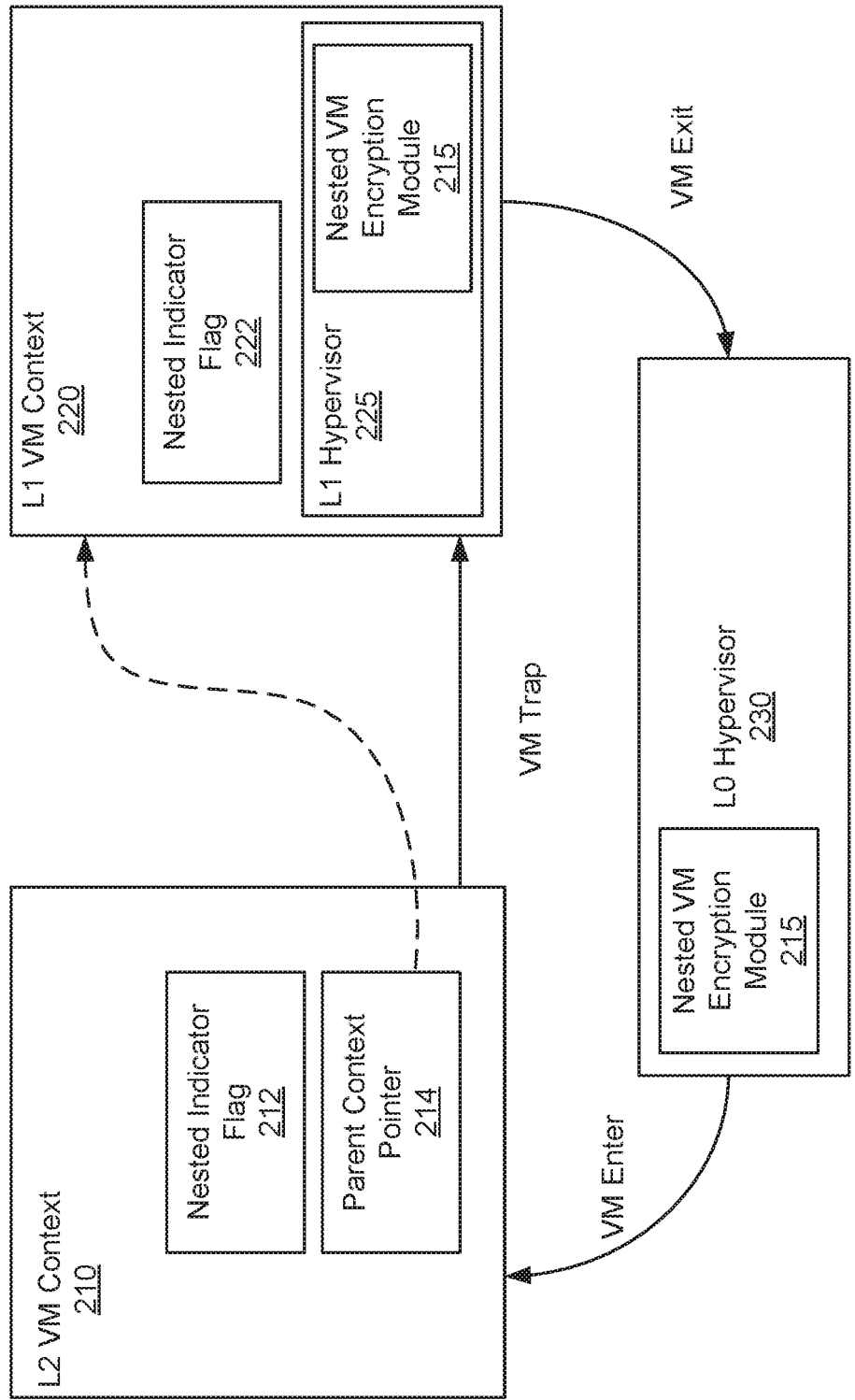
FIG. 2 is a block diagram that illustrates another example of a system for nested VM support in hypervisors of encrypted state virtual machines, in accordance with embodiments of the disclosure.

FIG. 2 is a block diagram that illustrates another example for nested VM support in encrypted state VM. As depicted, the system 200 includes a level 0 hypervisor 230, a level 1 VM context 220 running on the L0 hypervisor 230 and a level 2 VM context 210 that is nested within the L1 VM context 220. A L1 hypervisor 225 may run within the L1 VM context. The L1 hypervisor 225 may manage the L2 VM context 210 within the L1 VM context 220.

In one example, the L0 hypervisor 230 and/or L1 hypervisor 225 may include a nested VM encryption module 215. The nested VM encryption module 215 may provide a parent context pointer 214 and a nested indicator flag 212 to the L2 VM context 210 upon creation of the nested L2 VM. The parent context pointer 214 may indicate the context of the parent VM (i.e., L1 VM context 220). For example, the parent context pointer 214 of the L2 VM context 210 may point to the L1 VM context 220. The L1 hypervisor 225 or the L0 hypervisor 230 may include a nested indicator flag 222 within the L2 VM context 210 which may indicate whether the VM is nested within another VM. L1 VM context 220 may also include a nested indicator flag 222.

The nested VM encryption module 215 may also configure the processor on which the hypervisor and the VM are executing (e.g., processing device 110 of FIG. 1) to detect a privileged instruction from the L2 VM context 210. In one example, the privileged instruction may be a hypercall to the L0 hypervisor (e.g., to exit the VM and to provide control to the L0 hypervisor). When the privileged instruction is detected, the processing device may determine whether the L2 VM is nested within another VM. For example, the processing device may determine whether the nested indicator flag 212 is set to a value indicating that the L2 VM context 210 is nested guest. After determining that the L2 VM context 210 is a nested guest, the nested VM encryption module 215 may retrieve the parent context pointer 214 and, using the parent context pointer 214 switch to the L1 VM context 220 (i.e., a VM trap to the L1 VM context 220).

In one example, the nested VM encryption module 215 may determine whether the L1 VM context 220 is nested within another VM using nested flag indicator 222. If the nested flag indicator 222 were to indicate that the L1 VM context 220 is nested within another VM then the nested VM encryption module would switch to the context of the parent VM of the L1 VM context 220. However, as depicted in FIG. 2, the L1 VM context 220 is not nested and thus nested indicator flag 222 would indicate that the L1 VM context 220 is not nested. The nested VM encryption module 215 may then cause a VM exit from the L1 VM context 220 to the L0 hypervisor 230. Therefore, a context switch does not occur from the L2 VM context 210 to the L0 hypervisor 230. Rather, the context will be switched from the nested VM to the parent VM until a VM context is reached that is not nested (i.e, a root VM). Thus, if the L1 VM is encrypted, the nested L2 VM will not leak information to the L0 hypervisor 230 through direct VM exits to the L0 hypervisor 230.

Unlike an exit directly to the L0 hypervisor 230, the L0 hypervisor 230 may be trusted for re-entering the L2 VM context 210. Alternatively, the L0 hypervisor 230 can configure a processing device (e.g., processing device 110 of FIG. 1) to execute a VM enter without a VM exit. Thus, VM enter from the L0 hypervisor 230 may be supported by the processing device hardware while VM exits to the root hypervisor are not. Furthermore, the L0 hypervisor may be configured similarly to the processing device to detect a privileged instruction and provide the above described chain of context switches. Thus, additional VMs may be further nested within L2 VM context 210 and so on.

Figure 3:
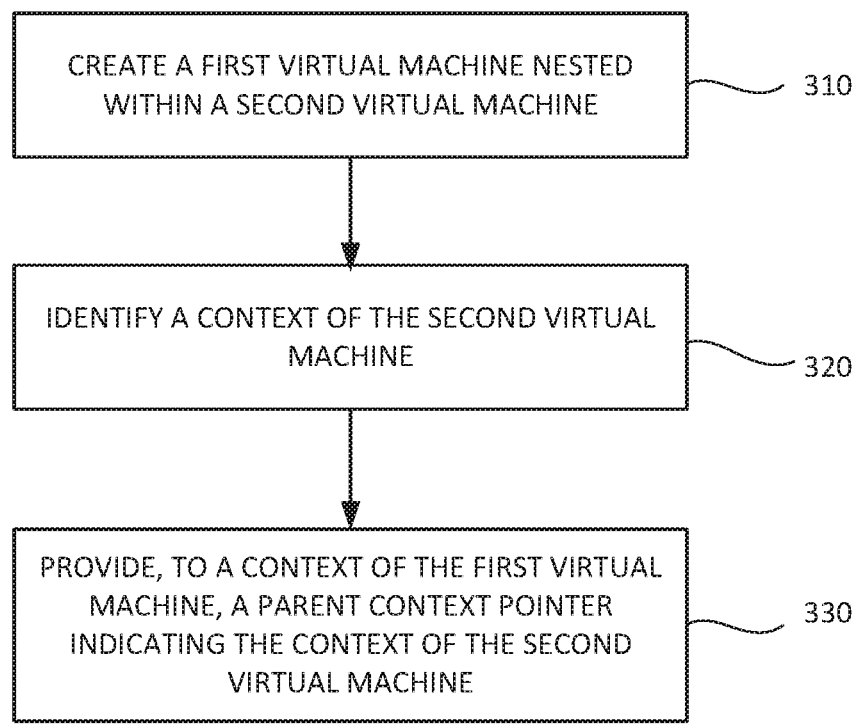
FIG. 3 is a flow diagram of a method of hypervisor support for nested VM encryption, in accordance with some embodiments.

FIG. 3 is a flow diagram of a method 300 of nested VM support for a hypervisor of an encrypted state VM, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a nested virtual memory encryption module 215 of FIG. 2.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic creates a first virtual machine nested within a second virtual machine. In one example, the first virtual machine and/or the second virtual machine may be an encrypted state virtual machine. The first virtual machine may be created by a hypervisor running within the second virtual machine or by a root hypervisor executing on the host machine and/or root operating system.

At block 320, the processing logic identifies a context of the second virtual machine. Identifying the context of the second virtual machine may include determining the context of the virtual machine in which the hypervisor creating the first virtual machine is executing. Alternatively, the root hypervisor may manage creation and execution of both the first and second virtual machines, and therefore may identify the context of the second virtual machine upon creation of the first virtual machine.

At block 330, the processing logic provides, to a context of the first virtual machine, a parent context pointer indicating the context of the second virtual machine. The parent context pointer may include an address pointer for the second virtual machine context. In one example, the processing logic may be configured to use the parent context pointer to switch from the context of the first virtual machine to the context of the second virtual machine (e.g., in response to a privileged instruction).

Figure 4:
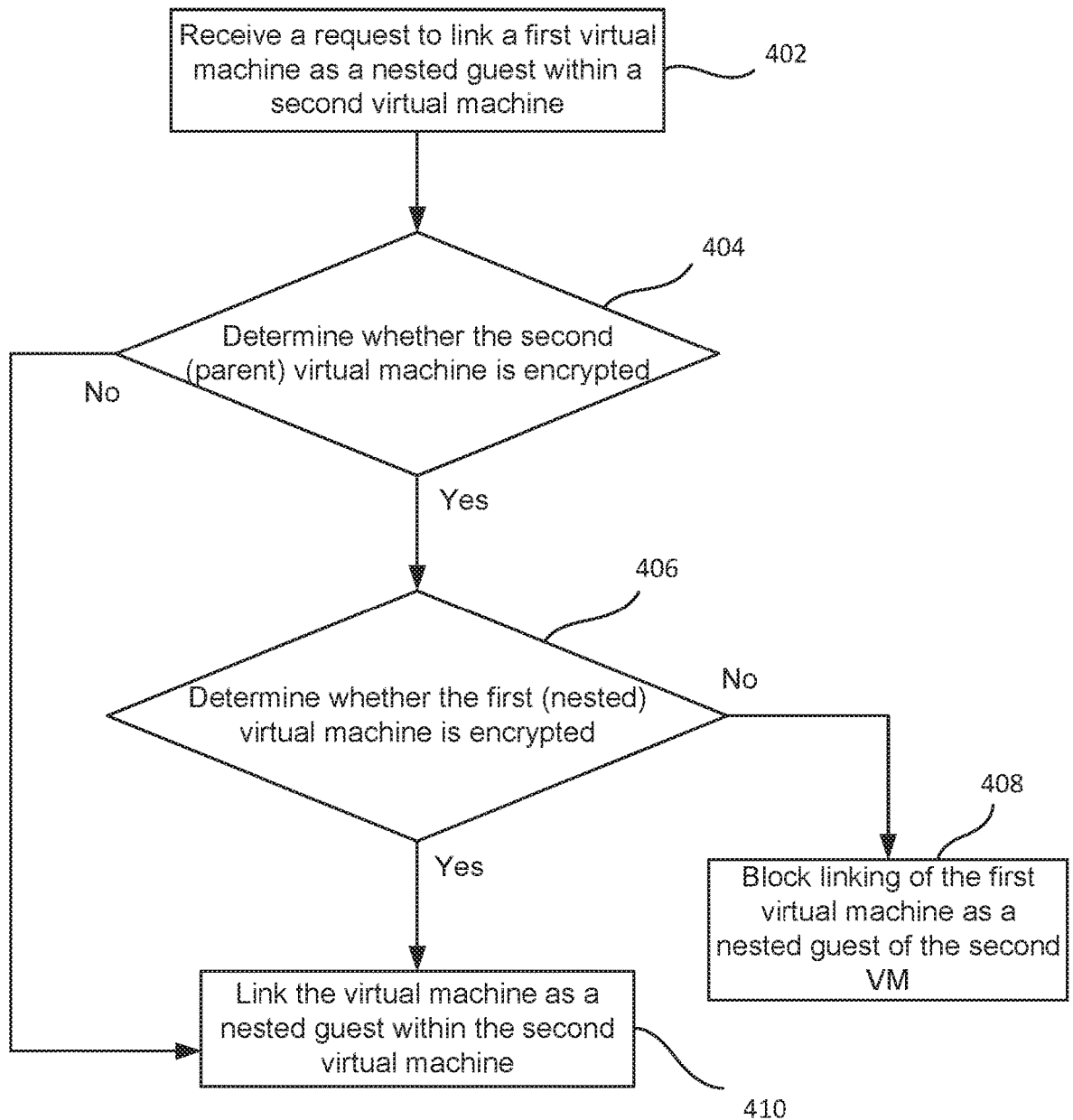
FIG. 4 is a flow diagram of a method for creating nested guest VMs in encrypted parent host VMs, in accordance with some embodiments.

FIG. 4 is a flow diagram of a method 400 of supporting memory encryption in nested virtual machines, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a nested virtual memory encryption module 215 of FIG. 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 402, where the processing logic receives a request to link a first virtual machine as a nested guest within a second virtual machine. At block 404, the processing logic determines whether the second virtual machine is encrypted. For example, the processing logic may determine whether the second virtual machine is an encrypted state VM. The second virtual machine may include an indication of particular data in memory and/or registers associated with the virtual machine to encrypt. In one example, the second virtual machine context may include an indication whether the second virtual machine is encrypted or not encrypted, such as a flag, a register, or other data structure. If the processing logic determines that the second VM is encrypted, the method continues to block 406. If the processing logic determines that the second VM is not encrypted, the method continues to block 410.

At block 406, in response to determining that the second virtual machine is encrypted, the processing logic determines whether the first virtual machine is encrypted. Similar to block 404, the first virtual machine may be encrypted or may not be encrypted. Again, the first VM may include an indication of particular data in memory and/or registers associated with the nested VM to encrypt. In one example, the first virtual machine context may include an indication whether the first virtual machine is encrypted or not encrypted, such as a flag, a register, or other data structure.

At block 408, in response to determining that the second VM is encrypted but that the first VM to be created is not encrypted, the processing logic blocks linking of the first VM as a nested guest of the second VM. In the case that the first VM is not encrypted but the second VM is encrypted, the first VM may cause information leaks to the hypervisor. Therefore, in such a case the processing logic may block linking of the non-encrypted first VM as a nested guest to avoid information leaks of the encrypted second VM. At block 410, in response to determining that both the second VM and the first VM are encrypted, the processing logic links the first virtual machine as a nested guest within the second virtual machine.

Figure 5:
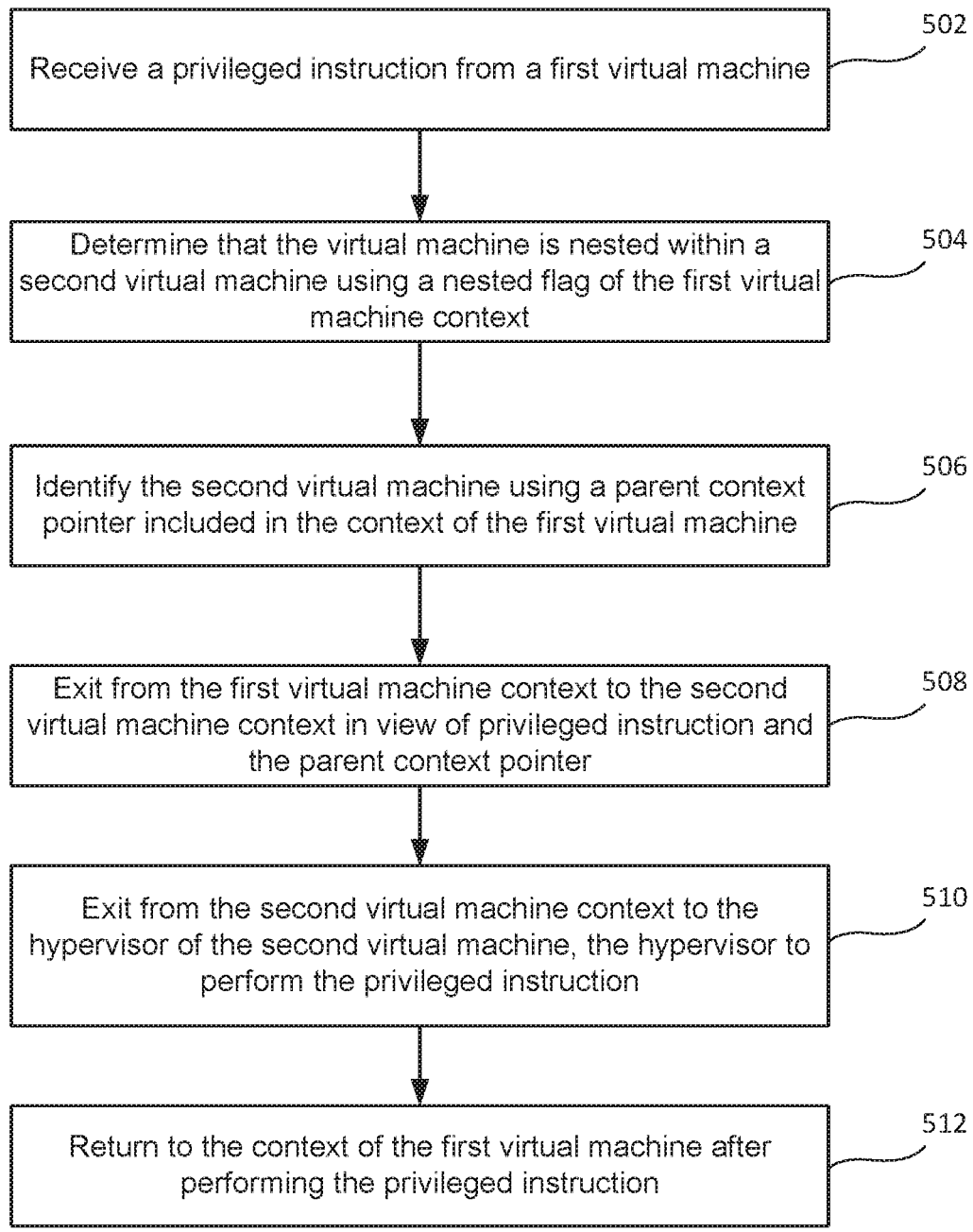
FIG. 5 is another flow diagram of another method for supporting nested VMs in an encrypted state VM, in accordance with some embodiments.

FIG. 5 is a flow diagram of a method 500 of nested VM in encrypted state VMs, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by a nested virtual memory encryption module 115 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 502, where the processing logic receives a privileged instruction from a virtual machine. The processing logic may be configured by a hypervisor to identify the privileged instruction. For example, a hypervisor may configure a processing device (e.g., CPU) to detect the privileged instruction from the context of the nested virtual machine.

At block 504, the processing logic determines that the virtual machine is nested within a second virtual machine. The context of the first virtual machine may include a flag to indicate whether the first virtual machine is a nested guest virtual machine of a parent host virtual machine. For example, if the first virtual machine is nested, the nested flag may be set to '1' or 'true' (or any other value) and if it is not nested, the nested flag may be set to '0' or 'false' (or any other value). Thus, the processing logic may check the value of the nested flag to determine whether the first virtual machine is a nested guest.

At block 506, the processing logic identifies the second virtual machine using a parent context pointer included in the context of the first virtual machine. A hypervisor may include the parent context pointer in the context of the first virtual machine upon creation of the first virtual machine. For example, the hypervisor may identify that the first virtual machine is a nested guest and then identify the parent host VM in which it is nested. The hypervisor may then provide to the context of the first VM a pointer to the second virtual machine context. The parent context pointer may include an address pointer to the context of the second virtual machine (i.e., the parent VM).

At block 508, the processing logic exits from the first virtual machine context to the second virtual machine context in view of the privileged instruction and the parent context pointer. In one example, the privileged instruction may be a hypercall that causes an exit from the first virtual machine to the root hypervisor (e.g., to perform a function). However, rather than exiting directly to the root hypervisor, the processing logic may exit from the first virtual machine to the context of the second virtual machine using the parent context pointer from the context of the first virtual machine. In one example, the hypervisor configures the processing device executing the processing logic to exit from the first virtual machine to the second virtual machine after receiving the privileged instruction.

At block 510, the processing logic exits from the second virtual machine context to the hypervisor of the second virtual machine, the hypervisor to perform the privileged instruction. In one example, exiting to the hypervisor provides control to the hypervisor to execute the privileged instruction. At block 512, the processing logic returns to the context of the first virtual machine after performing the privileged instruction. Unlike an exit directly to the root hypervisor, the root hypervisor may be trusted for entering or re-entering the first virtual machine. Alternatively, the root hypervisor can configure the CPU to execute a VM enter to the first VM from the hypervisor but not an exit from the VM to the hypervisor. Thus, VM enter from the root hypervisor may be supported by the CPU hardware while VM exits to the root hypervisor from a nested VM are not.

Figure 6:
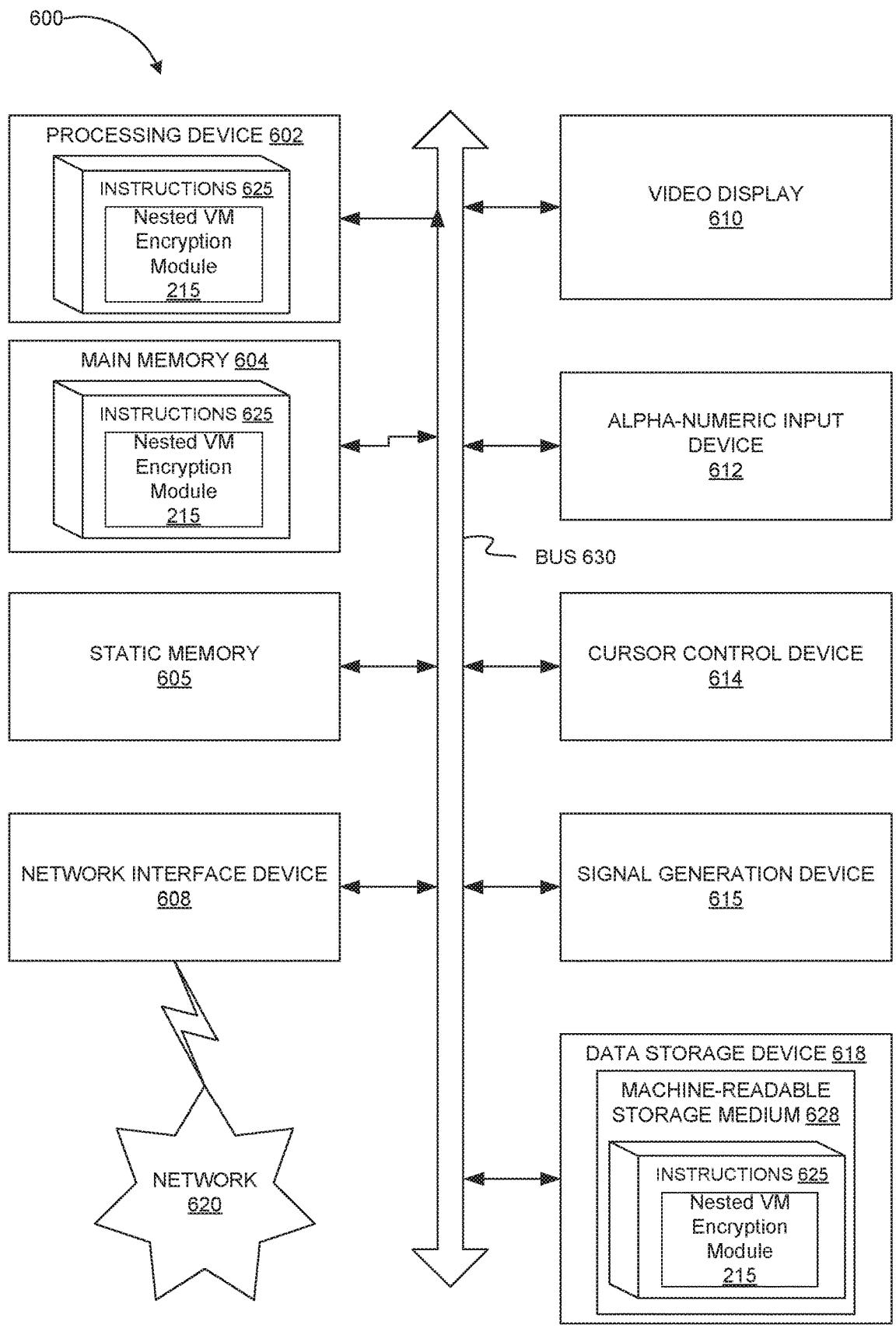
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a nested VM encryption module, e.g., nested VM encryption module 215, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving a request to link a first virtual machine as a nested guest within a second virtual machine;
determining whether the second virtual machine is encrypted and the first virtual machine is targeted to be encrypted;
in response to determining that the second virtual machine is encrypted and the first virtual machine is targeted to be encrypted, linking, by a hypervisor executing on a processing device, the first virtual machine as a nested guest within the second virtual machine during creation of the first virtual machine;
identifying a context of the second virtual machine;
providing, to a context of the first virtual machine, a parent context pointer indicating the context of the second virtual machine;
detecting a privileged instruction at the first virtual machine; and
in response to detecting the privileged instruction, exiting from the context of the first virtual machine and switching to the context of the second virtual machine using the parent context pointer instead of switching to the hypervisor.

2. The method of claim 1, further comprising:
setting, by the hypervisor, a flag in the context of the first virtual machine indicating that the first virtual machine is nested within another virtual machine.

3. The method of claim 1, wherein the privileged instruction comprises a hypercall and causes the exiting from the context of the first virtual machine to the context of the second virtual machine.

4. The method of claim 1, further comprising:
executing, by the hypervisor, the privileged instruction; and
in response to executing the privileged instruction, returning to the context of the first virtual machine.

5. The method of claim 1, further comprising:
in response to determining that the second virtual machine is encrypted and the first virtual machine is not targeted to be encrypted, denying linking of the first virtual machine as the nested guest within the second virtual machine.

6. The method of claim 1, further comprising:
creating, by the hypervisor, a third virtual machine nested within the first virtual machine; and
providing, to a context of the third virtual machine, a second parent context pointer indicating the context of the first virtual machine.

7. A system comprising:
a memory; and
a processing device operatively coupled to the memory, the processing device to execute a hypervisor to:
receive a request to link a first virtual machine as a nested guest within a second virtual machine;
determine whether the second virtual machine is encrypted and the first virtual machine is targeted to be encrypted;
in response to determining that the second virtual machine is encrypted and the first virtual machine is targeted to be encrypted, link the first virtual machine as a nested guest within the second virtual machine during creation of the first virtual machine;
identify a context of the second virtual machine;
provide, to a context of the first virtual machine, a parent context pointer indicating the context of the second virtual machine;
detect a privileged instruction at the first virtual machine; and in response to detecting the privileged instruction, exit from the context of the first virtual machine and switch to the context of the second virtual machine using the parent context pointer instead of switching to the hypervisor.

8. The system of claim 7, wherein the processing device is further to:
set a flag in the context of the first virtual machine indicating that the first virtual machine is nested within another virtual machine.

9. The system of claim 7, wherein the privileged instruction comprises a hypercall and causes the exit from the context of the first virtual machine to the context of the second virtual machine.

10. The system of claim 7, wherein the processing device is further to:
execute the privileged instruction; and
in response to executing the privileged instruction, return to the context of the first virtual machine.

11. The system of claim 7, wherein the processing device is further to:
in response to determining that the second virtual machine is encrypted and the first virtual machine is not targeted to be encrypted, deny linkage of the first virtual machine as the nested guest within the second virtual machine.

12. The system of claim 7, wherein the processing device is further to:
create a third virtual machine nested within the first virtual machine; and
providing, to a context of the third virtual machine, a second parent context pointer indicating the context of the first virtual machine.

13. A non-transitory computer-readable storage medium including instructions that, when executed by a processing device, cause the processing device to:
receive a request to link a first virtual machine as a nested guest within a second virtual machine;
determine whether the second virtual machine is encrypted and the first virtual machine is targeted to be encrypted;
in response to determining that the second virtual machine is encrypted and the first virtual machine is targeted to be encrypted, link, by a hypervisor executing by the processing device, the first virtual machine as a nested guest within the second virtual machine during creation of the first virtual machine;
identify a context of the second virtual machine;
provide, to a context of the first virtual machine, a parent context pointer indicating the context of the second virtual machine;
detect a privileged instruction at the first virtual machine; and
in response to detecting the privileged instruction, exit from the context of the first virtual machine and switch to the context of the second virtual machine using the parent context pointer instead of switching to the hypervisor.

14. The non-transitory computer-readable storage medium of claim 13, wherein the processing device is further to:
set, by the hypervisor, a flag in the context of the first virtual machine indicating that the first virtual machine is nested within another virtual machine.

15. The non-transitory computer-readable storage medium of claim 13, wherein the privileged instruction comprises a hypercall and causes the exit from the context of the first virtual machine to the context of the second virtual machine.

16. The non-transitory computer-readable storage medium of claim 13, wherein the processing device is further to:
execute, by the hypervisor, the privileged instruction; and
in response to executing the privileged instruction, return to the context of the first virtual machine.

17. The non-transitory computer-readable storage medium of claim 13, wherein the processing device is further to:
in response to determining that the second virtual machine is encrypted and the first virtual machine is not targeted to be encrypted, deny linkage of the first virtual machine as the nested guest within the second virtual machine.

* * * * *